(12) United States Patent
Ocket et al.

(10) Patent No.: US 11,740,105 B2
(45) Date of Patent: Aug. 29, 2023

(54) SENSOR DEVICE FOR MEASURING THE POSITION OF AN ELEMENT

(71) Applicants: TE Connectivity Belgium BV, Oostkamp (BE); TE Connectivity Germany GmbH, Bensheim (DE)

(72) Inventors: Tom Ocket, Oostkamp (BE); Tobias Becker, Speyer (DE); Moritz Harz, Speyer (DE)

(73) Assignees: TE Connectivity Belgium BV, Oostkamp (BE); TE Connectivity Germany GmbH, Bensheim (DE)

( * ) Notice: Subject to any disclaimer, the term of this patent is extended or adjusted under 35 U.S.C. 154(b) by 59 days.

(21) Appl. No.: 17/174,498

(22) Filed: Feb. 12, 2021

(65) Prior Publication Data
US 2021/0255002 A1 Aug. 19, 2021

(30) Foreign Application Priority Data
Feb. 13, 2020 (EP) .................................... 20157109

(51) Int. Cl.
*G01D 5/20* (2006.01)
*H01F 7/20* (2006.01)

(52) U.S. Cl.
CPC ............. *G01D 5/2006* (2013.01); *H01F 7/20* (2013.01)

(58) Field of Classification Search
CPC ...... G01D 5/12–2525; H07F 7/06; H07F 7/20
See application file for complete search history.

(56) References Cited

U.S. PATENT DOCUMENTS

| 8,947,074 B1* | 2/2015 | Youngquist | .......... G01D 5/2006 324/207.16 |
| 2004/0169505 A1* | 9/2004 | Alun | ..................... G01F 23/164 324/207.17 |
| 2007/0194781 A1* | 8/2007 | Zhitomirskiy | ......... G01D 5/204 324/207.17 |
| 2008/0284554 A1* | 11/2008 | Schroeder | ............... H01F 21/10 336/200 |

(Continued)

FOREIGN PATENT DOCUMENTS

| EP | 3299771 A1 | 3/2018 |
| WO | 2005085763 A2 | 9/2005 |

OTHER PUBLICATIONS

Extended European Search Report, European Application No. 20157109.8-1010, European Filing Date, Jul. 1, 2020.

*Primary Examiner* — Huy Q Phan
*Assistant Examiner* — David B Frederiksen
(74) *Attorney, Agent, or Firm* — Barley Snyder

(57) ABSTRACT

A sensor device for measuring a rotational position of an element that is rotatable about an axis of rotation includes a sender member emitting a magnetic field, a first receiving member formed by a first conductor and receiving the magnetic field, and a second receiving member formed by a second conductor and receiving the magnetic field. The first receiving member and the second receiving member are arranged within an annular ring segment having a period along a circumferential direction about the axis of rotation. The first conductor and the second conductor each define a plurality of loops. A shape of each of the loops follows in the circumferential direction a base function with half the period, the shape of only some of the loops deviates from the base function by a correction function.

16 Claims, 5 Drawing Sheets

(56) References Cited

U.S. PATENT DOCUMENTS

| | | | |
|---|---|---|---|
| 2012/0098527 A1* | 4/2012 | Ely | G01D 5/208 |
| | | | 324/207.15 |
| 2014/0132253 A1* | 5/2014 | Bertin | G01D 5/2053 |
| | | | 324/207.17 |
| 2014/0167788 A1* | 6/2014 | Fontanet | G01D 5/2258 |
| | | | 324/656 |
| 2017/0336192 A1* | 11/2017 | Moser | G01D 5/20 |
| 2018/0087928 A1* | 3/2018 | Jones | G01D 5/2073 |
| 2019/0195963 A1 | 6/2019 | Qama | |

* cited by examiner

SENSOR DEVICE FOR MEASURING THE POSITION OF AN ELEMENT

CROSS-REFERENCE TO RELATED APPLICATION

This application claims the benefit of the filing date under 35 U.S.C. § 119(a)-(d) of European Patent Application No. 20157109, filed on Feb. 13, 2020.

FIELD OF THE INVENTION

The present invention relates to a sensor device and, more particularly, to a sensor device for measuring a position of an element.

BACKGROUND

Sensor devices for measuring a position of an element often include at least one sender member for emitting a magnetic field and at least two receiving members for receiving the magnetic field. The sensor devices often are formed as an annular ring segment. An annular ring segment is an angular sector of an annular ring, which is "cut off" from the rest of the annular ring. More specifically, an outer radius and an inner radius relative to the axis of rotation border the annular ring, wherein the outer radius is larger than the inner radius. Additionally, the segment is defined only in an angle $\Theta$ on the annular ring, wherein the angle $\Theta$ is smaller than the full mechanical resolution of 360° of the sensor. Such an annular ring segment saves costs and assembly space. Usually, a plurality of n position elements spaced with period P are defined on the rotor, n being an integer inverse proportional to $\Theta$.

FIG. 12 shows an example of a sensor device 1000 for measuring a rotational position of an element 1200 that is rotatable about an axis of rotation. The sensor device 1000 includes a sender member 1010 for emitting a magnetic field, a first receiving member formed by a first conductor 1020, and a second receiving member formed by a second conductor 1030. The receiving members 1020, 1030 are arranged within an annular ring segment having period P along a circumferential direction C about the axis of rotation for receiving the magnetic field. The first conductor 1020 and the second conductor 1030 each define a plurality of loops, a shape of each loop follows in the circumferential direction C a base function f0 with half the period P.

A disadvantage of the prior art sensor devices is that they are often imprecise. For example, an annular ring segment causes harmonics in the angular error, because the magnetic flux is different at the ends of the sensor relative to a central part of the sensors. Furthermore, these angular errors change over the air gap between a stator carrying the sensor device and a rotor carrying the element.

SUMMARY

A sensor device for measuring a rotational position of an element that is rotatable about an axis of rotation includes a sender member emitting a magnetic field, a first receiving member formed by a first conductor and receiving the magnetic field, and a second receiving member formed by a second conductor and receiving the magnetic field. The first receiving member and the second receiving member are arranged within an annular ring segment having a period along a circumferential direction about the axis of rotation. The first conductor and the second conductor each define a plurality of loops. A shape of each of the loops follows in the circumferential direction a base function with half the period, the shape of only some of the loops deviates from the base function by a correction function.

BRIEF DESCRIPTION OF THE DRAWINGS

The invention will now be described by way of example with reference to the accompanying Figures, of which.

DETAILED DESCRIPTION OF THE EMBODIMENT(S)

The invention will now be described in detail, in an exemplary manner using embodiments and with reference to the drawings. The described embodiments are only possible configurations in which, however, the individual features as described herein can be provided independently of one another or can be omitted.

Figure 1:
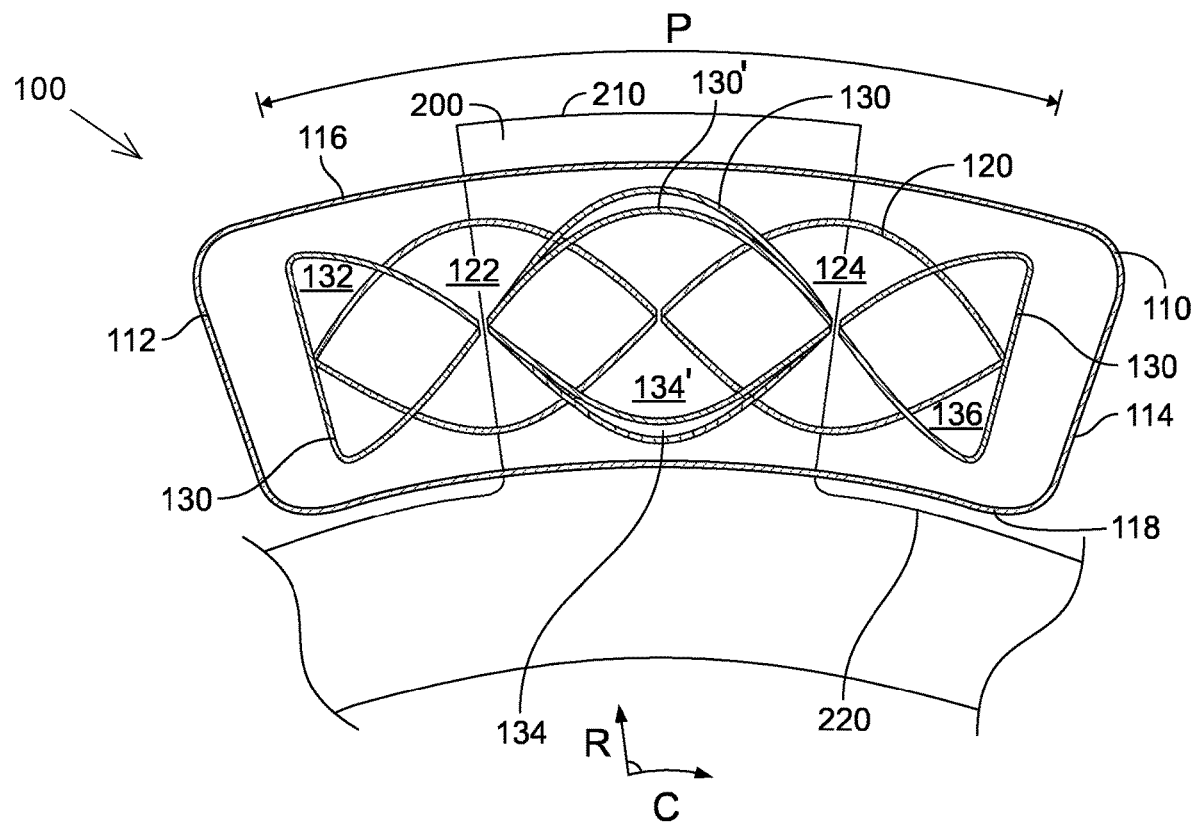
FIG. 1 is a schematic diagram of an assembly of a sensor device according to an embodiment.

An assembly 100 of a sensor device for measuring rotational position of an element that is rotatable about an axis of rotation is shown in FIG. 1. The rotatable element can be a shaft, for example, a shaft of a car engine.

A conductive element 200 is attached to the rotatable element such that it rotates with the rotatable element. Not shown in the figures is that the element 200 consists of n elements, n being an integer. Each element 200 is connected to the shaft and protrude sideways away from the shaft perpendicular to the axis of rotation, as shown in FIG. 1.

In an embodiment, a polar coordinate system is used in which each point on a plane is determined by a distance from a pole, namely the axis of rotation. The distance from the pole is measured in the radial direction and the angle is measured in the circumferential direction about the pole.

The sensor device, as shown in FIG. 1, includes a sender member 110 for emitting a magnetic field, a first receiving member formed by a first conductor 120, and a second receiving member formed by a second conductor 130. The sender member 110 can include a coil in order to generate the magnetic field. The magnetic field can be an alternating magnetic field. This can for example be achieved by applying an alternating current at the sender member 110. In order to save space, the coil can be planar. In an embodiment, the coil can be a spiral coil. The sender member 110 surrounds the receiving members 120, 130. In particular, the sender member is an annular ring segment in shape.

To keep the sensor device compact, the sender member 110 and/or at least one receiving member 120, 130 can lie substantially in a plane. In an embodiment, the members lie in the same plane. The plane can be perpendicular to the axis of rotation. Such a plane has to be understood as a substantially flat object where one dimension is much smaller than the other two dimensions.

The receiving members 120, 130 are arranged within an annular ring segment having period P along a circumferential direction C about the axis of rotation for receiving the magnetic field. The annular ring segment having a period P means that the annular ring segment has substantially the period P along a circumferential direction C. In particular, a period P that deviates only by ΔP is intended to be seen as an annular ring segment having substantially the period P. In particular, ΔP is less than half the period P.

In an embodiment, each of the receiving members 120, 130 is arranged within an angle segment Θ around the circumferential direction C about the pole. Mechanically, this annular ring segment has the nonzero length P that defines the fundamental period. Electrically, the period P corresponds to 2 Pi or 360 degrees. Herein, the term angular resolution refers to the electrical resolution.

In an embodiment, the first and second conductor 120, 130 each define a plurality of loops. Two conductors 120, 130 enable an absolute angle measurement within the annular ring segment. I.e. by a comparison of the two distinct signals, e.g. a division operation, the absolute position within the ring segment can be determined. This is particularly important for rotary sensors. In particular, in linear sensors usually one conductor is used as a relative position is often measured. However, even in case that a linear sensor uses two conductors, in a linear sensor the end sections are not used. In the shown embodiment, each conductor 120, 130 defines a plurality of loops. In more detail, as used herein a loop is a turn of a wire. Thus, when magnetic field lines pass through the loop, the two receiving members, each formed by a conductor 120, 130, sense the magnetic field generated by the sender member 110.

The element 200 that is rotatable about an axis of rotation on the rotor element, the element being made of a conductive material, influences the magnetic field of the sender member 110 as an eddy current is induced in the element 200. In other words, the magnetic field generated by the sender member 110 is disturbed depending on the angular position of the element 200. Consequently, the element 200 changes the induced voltage in each of the two receiving members 120, 130. The element 200, which forms a flap, disturbs the magnetic field generated by the sender member 110 so that the receiving members 120 and 130 receive different magnetic strengths of the magnetic field depending on the position of the element 200 and thus on the rotational position. From the signals received by the receiving members 120 and 130, the rotational position of the element 200 can hence be deduced.

Figure 12:
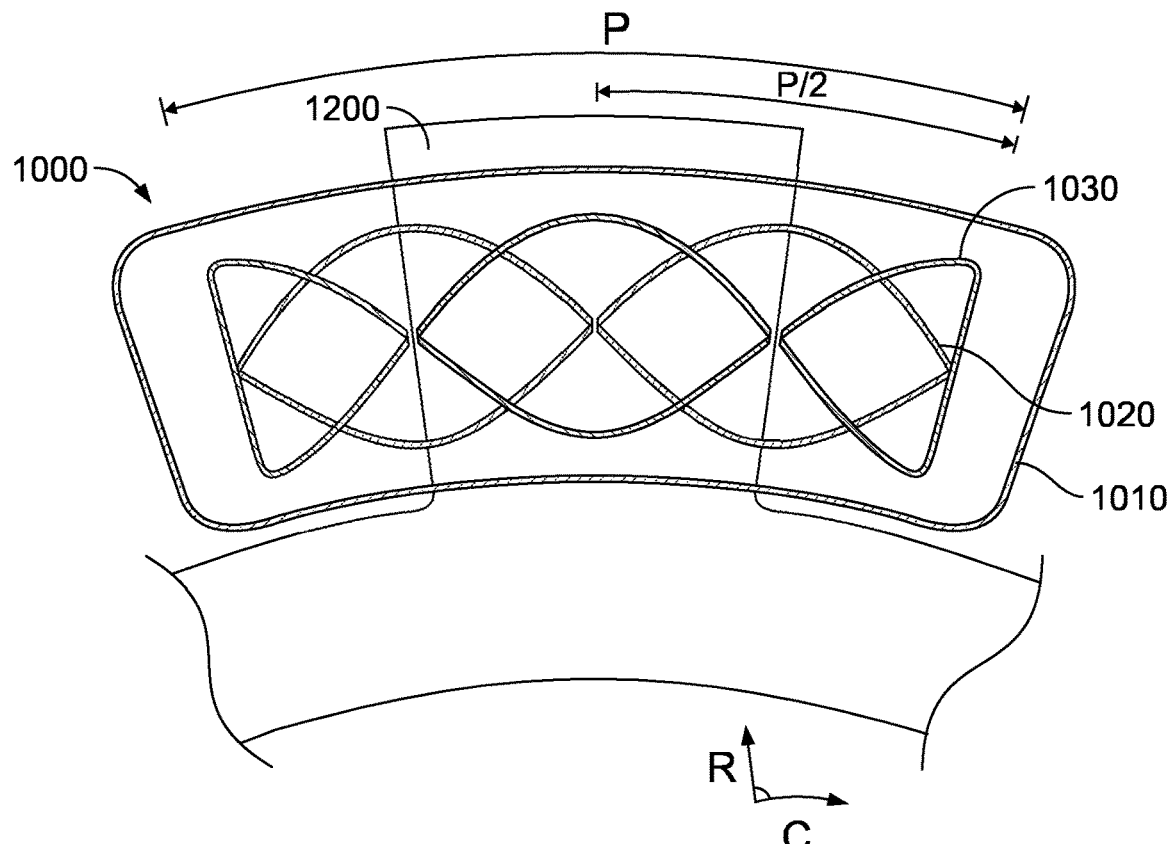
FIG. 12 is a schematic view of an assembly of a sensor device according to the prior art.

FIG. 1 shows an auxiliary line 130' defining the shape of the second conductor 130 following the base function f0, i.e. the shape that does not deviate from base function f0 by a correction function fc. Notably, the auxiliary line 130' is comparable with the second conductor 1030 shown in FIG. 12. The first conductor 120 defines two loops that surround areas 122 and 124. The second conductor 130 defines three loops surrounding areas 132, 134 and 136. The first conductor 120 and the second conductor 130 covers in the circumferential direction C an annular ring segment having a period P.

Figure 2:
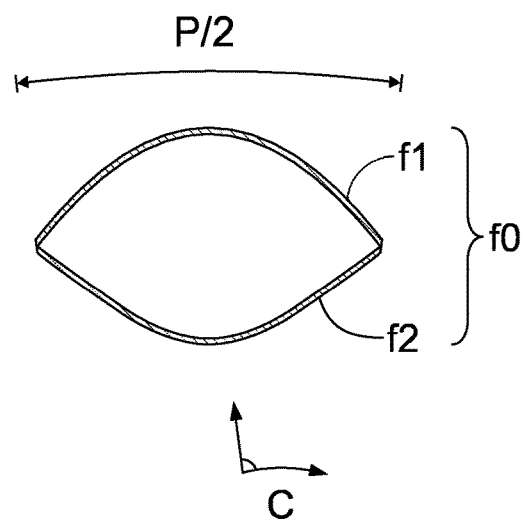
FIG. 2 is a schematic diagram of a loop that follows a base function.

As shown in FIG. 2, the shape of the four loops that surround areas 122, 124, 132, and 136 follows in the circumferential direction C a base function f0 with period P/2. The base function f0 with half the period P implies that each conductor 120, 130 delimits at least two areas, which are in the circumferential direction C congruent, when the first area is shifted by half the period P in the circumferential direction C. This arrangement allows the most compact design of the sensor within the annular ring segment and thus identifying the angle within 2 Pi. Notably, following in the circumferential direction C does not require that each loop extend by half the period P in circumferential direction C. For example, one of the conductors 120, 130 may form three loops, wherein two edge loops are adjacent to a central loop. The two edge loops together form an area, which covers half the period P.

The plurality of loops defined by the first conductor 120 are shifted by a quarter of the period P along the circumferential direction C with respect to loops defined by the second conductor 130 in the shown embodiment. In more detail, the two receiving members have substantially the same shape (expect for the correction factor) following half a period P and are shifted by a quarter of a period P to each other along the circumferential direction C. This allows a precise determination of the angle.

According to the embodiment shown in FIG. 1, the shape of the one loop that surrounds area 134 deviates from base function f0 by the correction function fc. Such a configuration allows to correct errors caused by the magnetic field, which is different at the ends of the sensor relative to a central part of the sensor and thus allows a more precise measurement. As used herein, only a part of the loops means that at least one loop but not all loops deviate from the shape defined by the base function f0. In other words, at least one loop is shaped by the base function f0. Notably, the auxiliary line 130' defines a loop that surrounds area 134' and follows in the circumferential direction C the base function f0 with P/2.

As used herein, the correction function fc is to be understood as a function with amplitude that is smaller than the amplitude of the base function f0. As used herein, deviates mean that a corrected area becomes incongruent with an uncorrected area, when the corrected area is shifted by half the period P in the circumferential direction C. The uncorrected area being shaped by a loop that follows in the circumferential direction C the not corrected base function f0. The corrected area being shaped by a loop that is additionally corrected by the correction function fc. In particular, the corrected area, when shifted by half the period P in the circumferential direction C, deviates only by a predetermined amount from the uncorrected area. The predetermined amount enabling to reconstruct a signal with reduced errors caused by the magnetic field. Notably, the magnetic field being different at the ends of the sensor relative to a central part of the sensor.

In the shown embodiment, the first conductor 120 forms an even number of first loops and the second conductor 130 forms an odd number of second loops. An even number of first loops allows that end sections of the surrounded areas at circumferential ends can have a wedge-shape, in particular with an angled or sharp tip. Such a configuration avoids errors and thus allows a more precise measurement for the signal generated by the first loops. Furthermore, a signal received by the first receiving member and a signal received by the second receiving member are shifted in the circumferential direction C. This allows optimizing the interpolation between a signal received by the first receiving member and a signal received by the second receiving member, and thus allows a more precise measurement.

The base function f0 is composed of a plurality of trigonometric functions. Composed means that for example a plurality of different trigonometric functions are combined by a mathematical operation. The correction function fc is derived by changing the amplitude and/or phase of at least one of the trigonometric functions. Thus, the correction function fc can be calculated in particular easy and precise way, and a more precise measurement is enabled.

As shown in FIG. 2, the base function f0 is described in detail. According to one embodiment, the base function f0 is composed of a first function f1 and a second function f2. The first function f1 and the second function f2 are substantially mirror symmetrical with respect to the cylindrical circumferential direction C to each other. According to one embodiment, the first function f1 can be expressed by equation (1) and the second function f2 can be expressed by equation (2):

$$f1 = HA0 + HA1*\cos(\alpha) + HA2*\cos(2\alpha) + HA3*\cos(3\alpha) \quad \text{and} \quad (1)$$

$$f2 = HA0 - HA1*\cos(\alpha) - HA2*\cos(2\alpha) - HA3*\cos(3\alpha), \quad (2)$$

wherein the coefficients HA0 to HA3 describe the amplitude of the trigonometric functions and $\alpha$ is the argument of the trigonometric functions. Advantageously, the coefficients may be chosen so that the endpoints of the first function f1 comes together with the endpoints of the second function f2.

Figure 3:
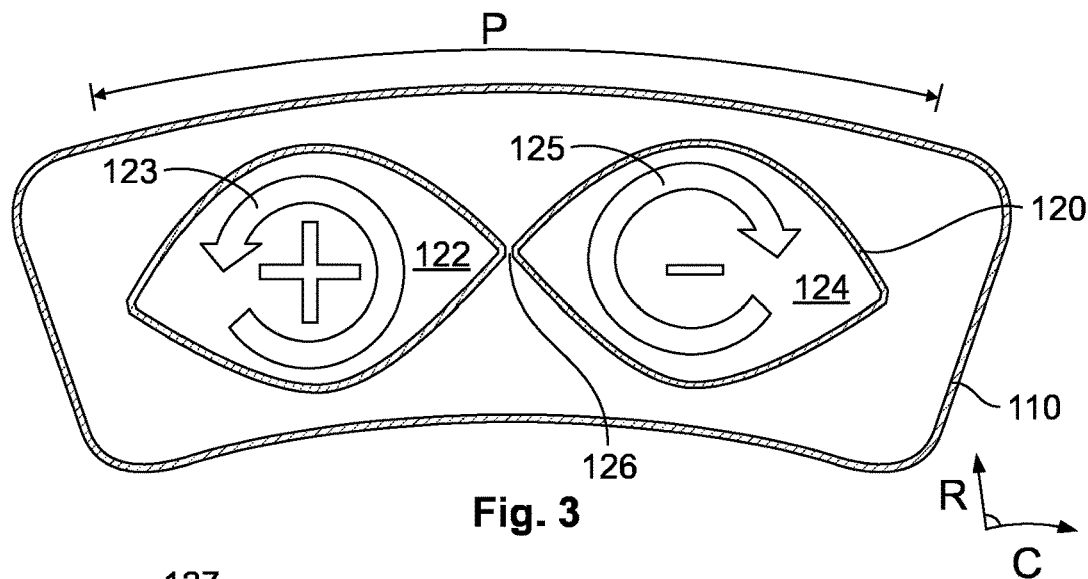
FIG. 3 is a schematic diagram of a first receiving member and a coil.

Further, FIG. 3 shows an example of a first receiving member formed by the first conductor 120 defining two loops, a shape of each loop follows in the circumferential direction C the base function f0. In more detail, the first conductor 120 defines two surround areas 122 and 124. In particular, the first conductor 120 traces a shape of two abutting eyes herein referred to as eye-shaped loops. Notably, each loop follows the shape defined in FIG. 2. The eye-shaped first loops define two convex areas each expanding and contracting in a circumferential direction about the axis of rotation.

Figure 10:
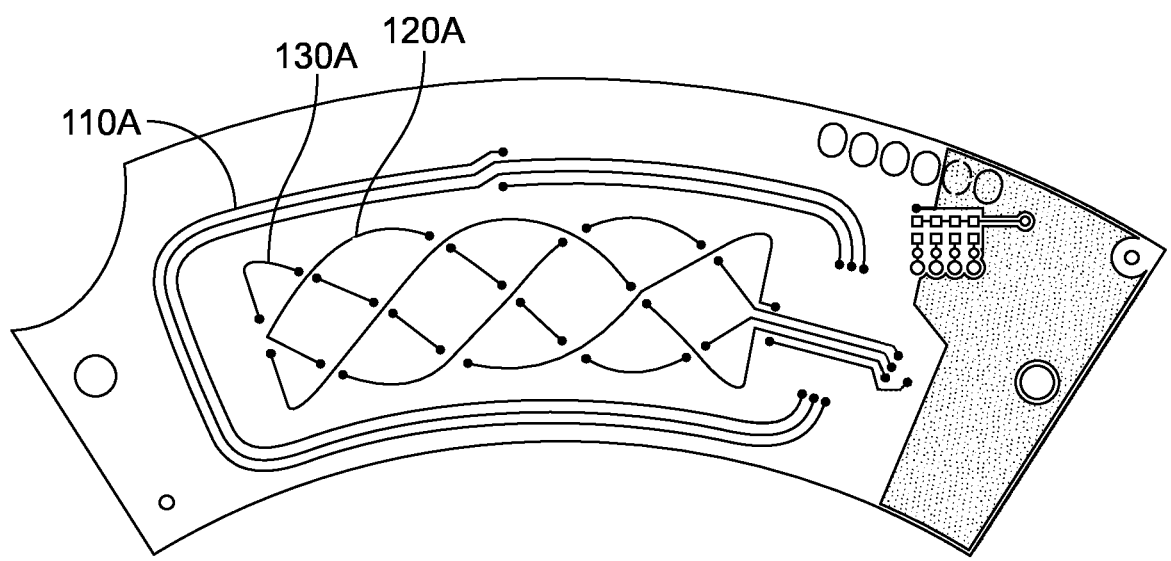
FIG. 10 is a plan view of a circuit board of a first part of a sensor.
Figure 11:
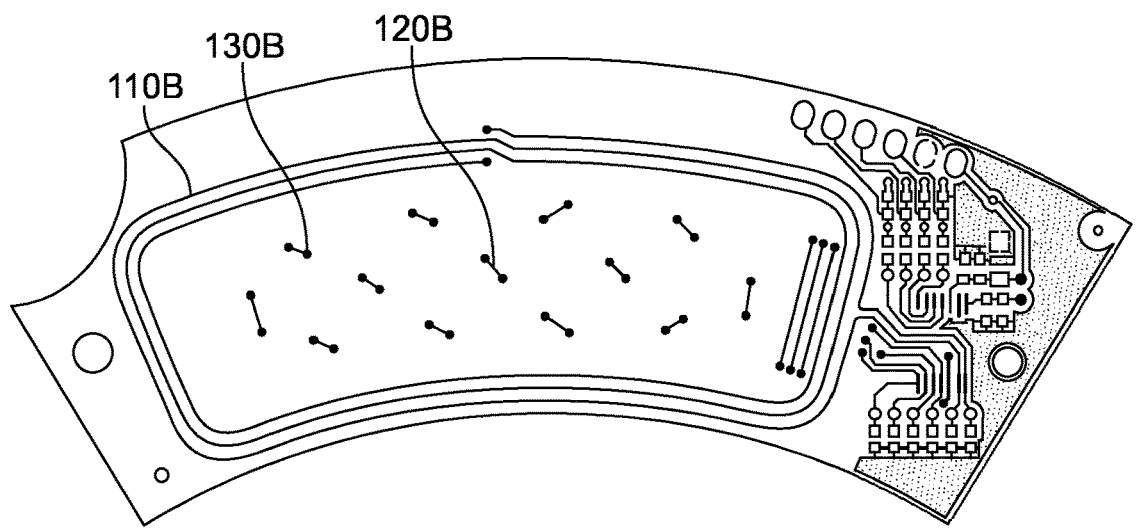
FIG. 11 is a plan view of a circuit board of a second part of the sensor.

According to one embodiment, the loops are wound in opposite directions. In more detail, at intersection point 126 shown in FIG. 3 the first conductor 120 is not short-circuited. In other words, at the area of intersection point 126 the first conductor 120 is located at different levels to avoid a current flow. For example, as shown in FIGS. 10 and 11, a first part 120A of the first conductor 120 can be located on a front side and a second part 120B of the first conductor 120 can be located on a backside of a PCB.

As shown in FIG. 3, the surrounded areas 122 and 124 are congruent when surrounded area 122 is shifted by half the period P in the circumferential direction C. In other words, both surrounded areas 122 and 124 are shaped in the circumferential direction C by the same base function f0 with half the period P.

The sender member 110 that surrounds the first receiving member 120 is shown in FIG. 3. When a magnetic field is emitted from the sender member 110, voltages are induced. The arrows 123 and 125 indicate the winding direction of the coil. As a matter of presentation, in the Figures the conductors 120 are closed, but in fact at one side a loop is open and connected to a chip that is measuring those signals. As the two abutting loops formed by the first conductor 120 are wound in opposite directions and the areas 122 and 124 delimited by the loops conductor are equal, the measured net voltage is 0V.

Figure 4:
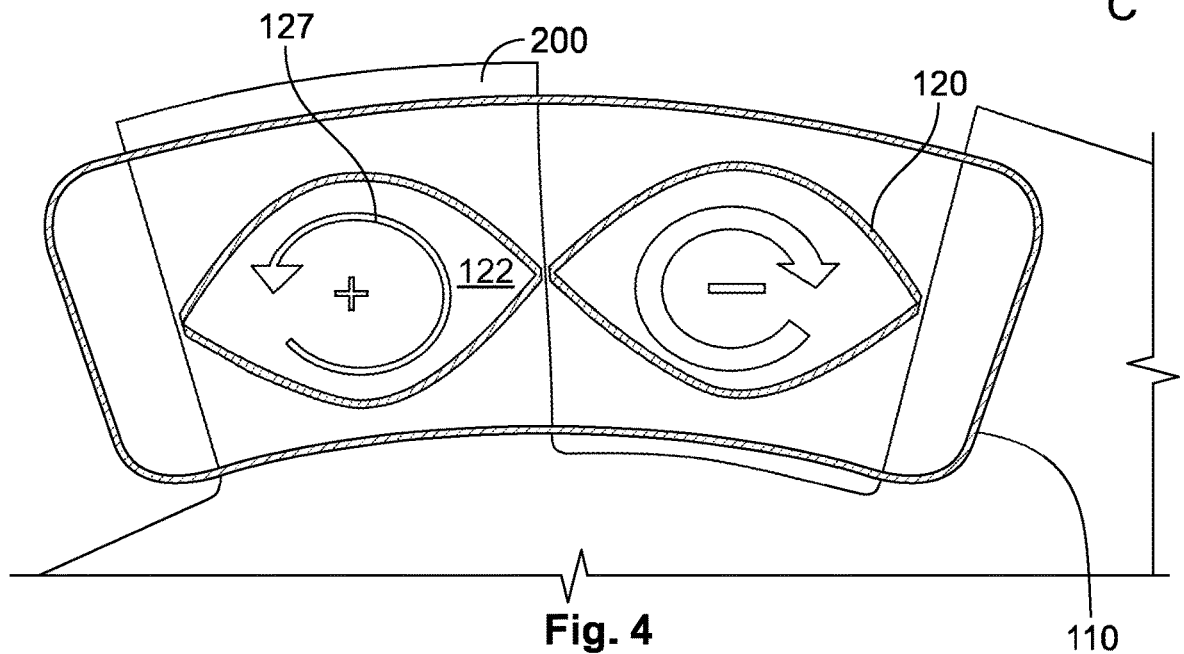
FIG. 4 is a schematic diagram of the first receiving member with an element arranged at a rotor.

FIG. 4 shows in addition to FIG. 3 an element 200 that opposes the area 122 surrounded by a loop of the conductor 120. In the element 200 is induced an eddy current due to the magnetic field generated by the sender member 110. Consequently, the magnetic field is reduced within the area 122. Thus, as indicated by arrow 127, a lower voltage is induced in the loop surrounding the area 122 and the measured voltage is not equal to 0V. From the amount of the induced voltage, the rotational position of the element 200 can be derived.

Figure 5:
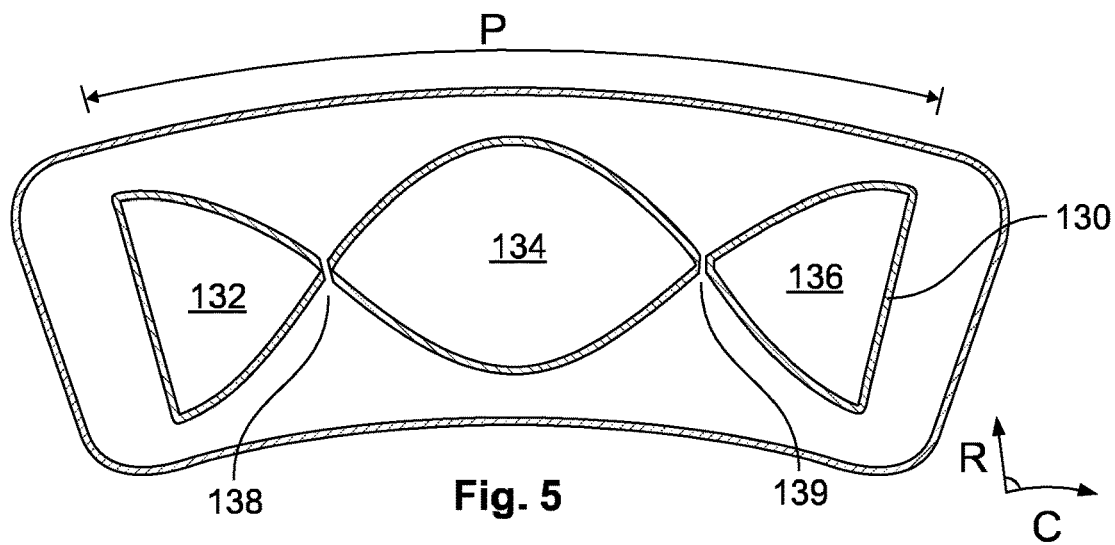
FIG. 5 is a schematic diagram of a second receiving member and a coil.

FIG. 5 shows an example of a second receiving member formed by the second conductor 130 defining three loops, a shape of each loop follows in the circumferential direction C the base function f0. In more detail, the second conductor 130 defines three surrounded areas 132, 134, and 136. In particular, the second conductor 130 traces a shape of a candy herein referred to as candy-shaped loops. Notably, the central area 134 is identical to surrounded area shown in FIG. 2. The central loop defines a convex area each expanding and contracting in a circumferential direction C about the axis of rotation. Further, by shifting the edge area 132 by period P in the circumferential direction and combining area 132 with edge area 136, a combined area can be derived that is identical to surrounded area shown in FIG. 2. Thus, the combined loop defines a convex area expanding and contracting in the circumferential direction C about the axis of rotation. This configuration allows an optimized usage of the available sensor space and allows a more precise measurement.

In an embodiment, the centroid of the areas delimited by the first and second conductors 120, 130 are equal in the circumferential direction C. Such a configuration allows that a phase shift term between the values measured by the two receiving members becomes zero, and thus, the measurement needs not corrected in view of said phase shift. This allows a more precise measurement. In particular, such an error cannot easily be corrected afterwards at the user end by software.

In an embodiment, each loop or at least a part of each loop is substantially mirror symmetrical with respect to the circumferential direction C. Additionally or alternatively, the first conductor 120 and the second conductor 130, or at least a part of each of the first conductor 120 and the second conductor 130, follows a substantially mirror symmetrical trace with respect to a radial direction R. Such a configuration allows that the receiving members use symmetric structures of the annular ring segment thereby avoiding or at least reducing errors of edge effects. Substantially, means a part of each loop or a part of the first conductor 120 and the second conductor 130 is symmetric. In other words, at least a part of each loop is mirror symmetrical with respect to the circumferential direction C. However, due to the correction function fc not the complete loop or the complete first conductor 120 and the second conductor 130 is a symmetric structure.

In an embodiment, the sections of the two conductors 120, 130 that define the loops in the circumferential direction C comprise mainly or only curved sections. This can further improve the signal quality. In particular, no straight sections may be present in this area. Nevertheless, such straight sections can be present in other parts of the conductors 120, 130. For example, parts of the conductors 120, 130 that limit the loops in radial direction R and/or do not surround the loops, e.g. connect abutting loops, and/or do not bound/limit the loops in the circumferential direction C but lead towards the loops in the radial direction R and/or are used for contacting, e.g. end in a terminal or solder part, can comprise straight sections.

According to one embodiment, abutting loops are wound in opposite directions. In other words, at intersection points 138 and 139 shown in FIG. 5 the second conductor 130 is not short-circuited. In other words, at the area of intersection point 138 and 139 the second conductor 130 is located at different levels to avoid a current flow. For example, as shown in FIGS. 10 and 11, a first part 130A of the second conductor 130 can be located on a front side and a second part 130B of the second conductor 130 can be located on a backside of a PCB.

As shown in FIG. 5, the surrounded area 132 is congruent with a part of surrounded area 134 when surrounded area 132 is shifted by half the period P in the circumferential direction C. Similarly, the surrounded area 136 is congruent with a part of surrounded area 134 when the part of surrounded area 134 is shifted by half the period P in the circumferential direction C.

According to the invention, only a part of the loops deviates from the base function f0. According to the embodiment shown in FIG. 1, the loop that surrounds the area 134 deviates from the base function f0, which is indicated by auxiliary line 130' in FIG. 1.

As shown in FIG. 1, the sender member 110 follows the shape of an annular ring segment. In particular, the sender member 110 comprises radial sections 112 and 114 and segment sections 116 and 118. Due to the radial sections 112, 114 the magnetic field is not constant in the circumferential direction C. In more detail, the magnetic field is inhomogeneous in the circumferential direction C. Thus, the angular resolution deteriorates close to the radial sections 112, 114. The correction function fc is designed to compensate for these errors.

According to the embodiment shown in FIG. 1, the correction function fc is derived by changing the coefficient HA1 in equations (1) and (2) for the central loop of the second conductor 130, i.e. the loop that surrounds area 134, to deviate from the base function indicated by the auxiliary line 130'. Consequently, the errors caused by the radial sections 112 and 114 are compensated by changing the area 134 surrounded by the central loop formed by the second conductor 130.

Figure 6:
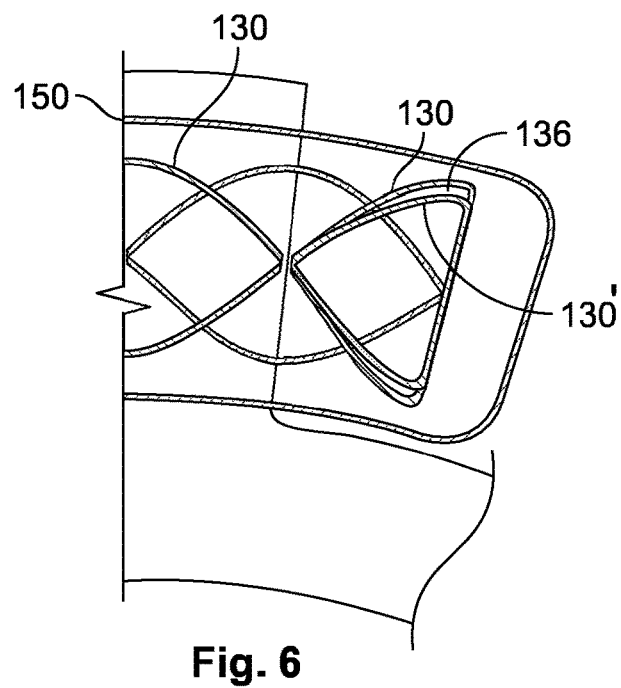
FIG. 6 is a schematic diagram of a part of a sensor device according to another embodiment.
Figure 7:
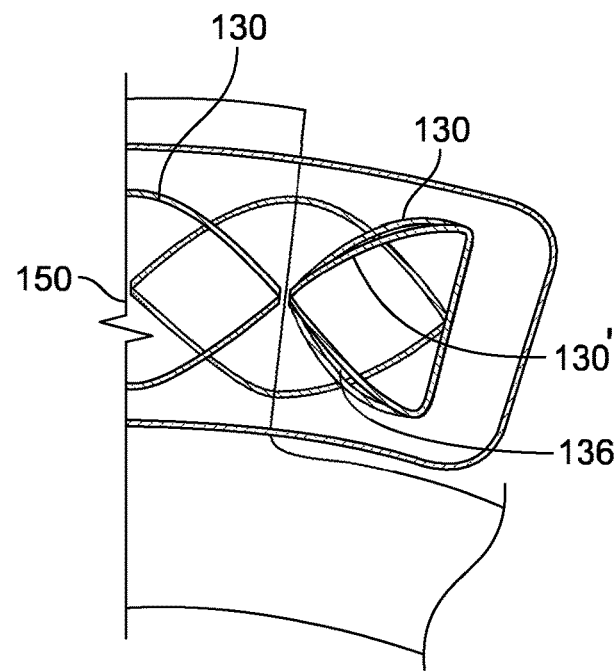
FIG. 7 is a schematic diagram of a part of a sensor device according to another embodiment.
Figure 8:
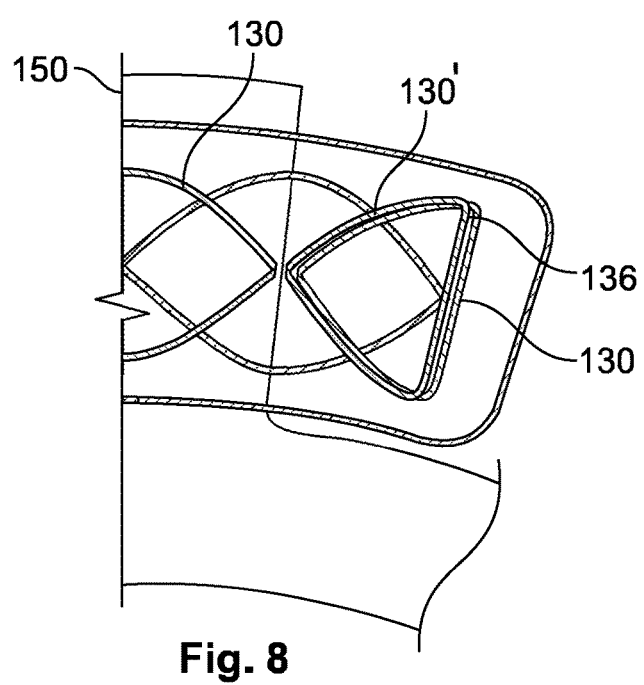
FIG. 8 is a schematic diagram of a part of a sensor device according to another embodiment.

FIGS. 6 to 9 show alternative embodiments. In particular, in FIGS. 6 to 8 a shape of a loop defined by the second conductor 130 surrounding the edge area 136 deviates from the shape of a loop following the base function, which is indicated with auxiliary line 130'. The correction function fc in the embodiment shown in FIG. 6 is derived by changing the coefficient HA1 in equations (1) and (2). The correction function fc in the embodiment shown in FIG. 7 is derived by changing the coefficient HA1 and HA3 in equations (1) and (2). The correction function fc in the embodiment shown in FIG. 8 is derived by adding a phase shift term to the argument in equations (1) and (2). A combination of a phase shift and a change of the coefficients may be used to determine the correction function fc.

Figure 9:
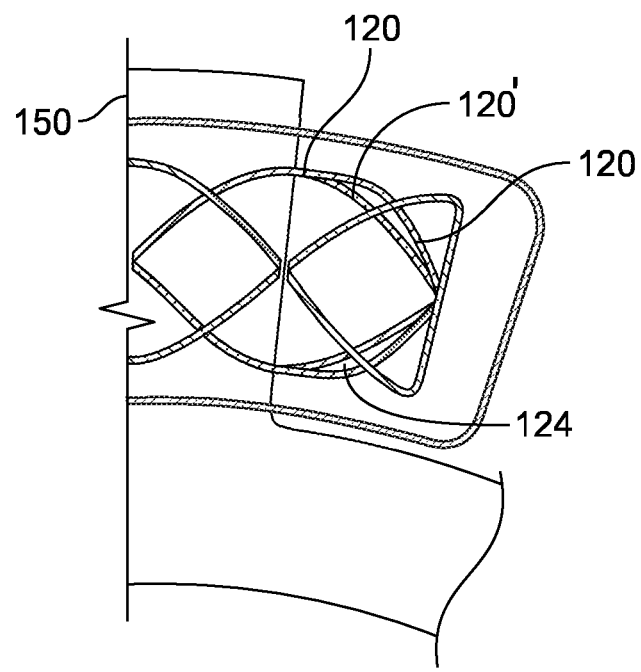
FIG. 9 is a schematic diagram of a part of a sensor device according to another embodiment.

Further, in FIG. 9 a shape of a loop defined by the first conductor 120 surrounding the area 124 deviates from the shape of a loop following the base function, which is indicated with auxiliary line 120'.

Notably, FIGS. 6 to 9 show only a part of the sensor device. According to an advantageous embodiment, the first conductor 120 and the second conductor 130 follows a substantially mirror symmetrical trace with respect to mirror axis 150, the mirror axis directing in radial direction.

It has to be understood that for reasons of presentation, the alternative embodiments are described separately. A combination thereof is possible. For example, the loops defined by the first conductor 120 and two of the loops defined by the second conductor 130 are corrected while a third loop of the second conductor 130, e.g. the central loop, is shaped by the base function f0. Notably, the base function f0 is not limited to the four terms discussed in Equations (1) and (2).

In an embodiment, the element 200 is an annular ring segment with a length P/2 in the circumferential direction C, as shown in FIG. 1. The element 200 is opposing the sensor 100. The element 200 has an outer radius 210 that is larger than the radius of the segment section 116 and the element 200 has an inner radius 220 that is less than the radius of the segment section 118.

The correction function fc may be adapted to compensate for errors in the magnetic field that are caused by a varying air gap. By way of example, the distance between the elements 200 opposing the sensor, i.e. the air gap, is dependent on the temperature of the sensor assembly 100. For example, if a car is driving, the sensor assembly 100 may heat up. The correction function fc can compensate for such temperature effect causing a change of the air gap distances, when the sensor is operated. Thus, the angular resolution is optimized.

FIG. 10 shows a circuit board of a first part of the sensor and FIG. 11 shows a circuit board of a second part of the sensor. According to one embodiment, the first part 110A of the sender member 110 is located on a front side of a printed circuit board (PCB) and the second part 110B is located on a backside of the PCB. In such an embodiment, the sensor device still lies substantially in a plane.

According to an aspect of the embodiment shown in FIGS. 10 and 11, the sender member 110 comprises a conductive path that forms a coil, in particular a spiral coil on the arcuate carrier, which is embodied as a PCB. When running a current through the sender member 110, a magnetic field results which is then disturbed by the rotating member and received by the receiving members 120, 130. Depending on whether the current of the sender member 110 runs in one direction or the other, for example clockwise or counterclockwise in the sender member 110, the magnetic field is directed in one direction or the other.

According to a further aspect of the embodiment shown in FIGS. 10 and 11, the first receiving member 120 comprises a first part 120A of the first conductor that is located on a front side and a second part 120B of the first conductor is located on a back side of a PCB. The second receiving member comprises a first part 130A of the first conductor that is located on the front side and a second part 130B of the first conductor is located on the back side of the PCB. The first receiving member 120 and the second receiving member 130 can each also comprise a conductive path on the PCB.

According to a further embodiment, a receiving member 120, 130 may be fabricated separately from the coil. In particular, at least one of the receiving members 120, 130 may be fabricated on a PCB and the sender 110 may be fabricated on a different PCB.

In another embodiment, the concepts described herein may also be applied to a linear sensor in which the sensor device is for measuring a linear position of an element that is moving linearly on an axis. According to the second embodiment, a Cartesian coordinate system is used.

In the second embodiment, the sender 110 and the receiving members 120, 130 are arranged within a segment, such as one being rectangular in shape, having length L along the axis for receiving the magnetic field. The segment having a length means that the segment has substantially the length L along the axis. In particular, a length L that deviates only by ΔL is intended to be seen as segment having substantially the length L. In particular, ΔL is less than half the length L. The length L is analogous to the period P of the embodiment described above.

Two conductors enable an absolute position measurement within the segment. I.e. by a comparison of the two distinct signals, e.g. a division operation, the absolute position within the segment can be determined. This is particularly important for linear sensor, which need to provide precise measurements at the edges. Usually, in linear sensors the end sections are not used. The element 200 is linearly moveable along an axis of the receiving members 120, 130 and changes an induced voltage in the receiving members 120, 130.

The assembly 100 according to the various embodiments described above provides a solution that gives a higher precision and is optimized in assembly space, in particular reducing the area of the annular ring segment.

What is claimed is:

1. A sensor device for measuring a rotational position of an element that is rotatable about an axis of rotation, comprising:
   a sender member emitting a magnetic field;
   a first receiving member formed by a first conductor and receiving the magnetic field; and
   a second receiving member formed by a second conductor and receiving the magnetic field, the first receiving member and the second receiving member arranged within an annular ring segment having a period along a circumferential direction about the axis of rotation, the first conductor and the second conductor each define a plurality of loops, a shape of each of the loops follows in the circumferential direction a base function with half the period, the base function is composed of a plurality of trigonometric functions, the shape of only some of the loops of one of the first conductor and the second conductor deviates from the base function by a correction function and the shape of the other of the loops of the one of the first conductor and the second conductor follows the base function.

2. The sensor device of claim 1, wherein the first conductor forms an even number of first loops and the second conductor forms an odd number of second loops.

3. The sensor device of claim 2, wherein the first loops are eye-shaped.

4. The sensor device of claim 2, wherein the second loops are candy-shaped.

5. The sensor device of claim 1, wherein a centroid of each of a plurality of areas delimited by the first conductor and the second conductor is substantially equal in the circumferential direction.

6. The sensor device of claim 1, wherein the correction function is derived by changing an amplitude and/or a phase of at least one of the trigonometric functions.

7. The sensor device of claim 1, wherein each loop is substantially mirror symmetrical with respect to the circumferential direction.

8. The sensor device of claim 1, wherein the first conductor and the second conductor follow a substantially mirror symmetrical trace with respect to a radial direction.

9. The sensor device of claim 1, wherein the loops of the first conductor are shifted by a quarter of the period along the circumferential direction with respect to the loops of the second conductor.

10. The sensor device of claim 1, wherein a pair of abutting loops of the loops of the first conductor are wound in opposite directions and a pair of abutting loops of the loops of the second conductor are wound in opposite directions.

11. The sensor device of claim 1, wherein a plurality of curved sections of the first conductor and the second conductor define the loops in the circumferential direction.

12. The sensor device of claim 1, wherein the sender member is a coil.

13. The sensor device of claim 1, wherein the sender member surrounds the first receiving member and the second receiving member.

14. The sensor device of claim 1, wherein the sender member and/or at least one of the first receiving member and the second receiving member substantially lie in a plane.

15. The sensor device of claim 1, wherein at least one of the first receiving member and the second receiving member is formed by a conductive path on a printed circuit board.

16. A sensor device for measuring a linear position of an element that is movable linearly along an axis, comprising:
   a sender member emitting a magnetic field;
   a first receiving member formed by a first conductor and receiving the magnetic field;
   and a second receiving member formed by a second conductor and receiving the magnetic field, the first receiving member and the second receiving member arranged within a segment having a length along the axis, the first conductor and the second conductor each define a plurality of loops, a shape of each of the loops follows along the axis a base function with half the length, the base function is composed of a plurality of trigonometric functions, the shape of only some of the loops of one of the first conductor and the second conductor deviates from the base function by a correction function and the shape of the other of the loops of the one of the first conductor and the second conductor follows the base function.

* * * * *